United States Patent [19]

Ferris et al.

[11] 4,047,838
[45] Sept. 13, 1977

[54] BLADE PITCH CONTROL MECHANISM FOR HELICOPTERS

[75] Inventors: Donald L. Ferris; Robert L. Faiz, both of Newtown, Conn.

[73] Assignee: United Technologies Corporation, Hartford, Conn.

[21] Appl. No.: 669,411

[22] Filed: Mar. 22, 1976

[51] Int. Cl.² .......................................... B64C 27/10
[52] U.S. Cl. .................... 416/115; 416/129; 416/168 R
[58] Field of Search ........... 416/114, 115, 129, 127, 416/168, 157 B

[56] References Cited

U.S. PATENT DOCUMENTS

| | | | |
|---|---|---|---|
| 2,271,473 | 1/1942 | Bennett | 416/115 |
| 2,540,543 | 2/1951 | Neville | 416/115 |
| 2,629,570 | 2/1953 | Carnahan | 416/115 X |
| 2,829,721 | 4/1958 | Gebhard | 416/115 X |
| 3,486,832 | 12/1969 | Stone et al. | 416/114 |

FOREIGN PATENT DOCUMENTS 936,071  7/1948  France ........................ 416/114

*Primary Examiner*—Everette A. Powell, Jr.
*Attorney, Agent, or Firm*—M. B. Tasker; V. F. Hauschild

[57] ABSTRACT

Pitch control linkage for the upper rotor of coaxial counterrotating rotors utilizes conventional swashplate, control rod and servomotor elements for changing blade pitch but without the conventional rotating and non-rotating scissors for reacting swashplate torque. This is accomplished by the use of rotating and non-rotating walking beams and combination torque reacting control rods between the walking beams and the rotatable and non-rotatable swashplate elements. Means are also disclosed for shimming the rotatable walking beams to achieve pre-track adjustment of the pitch of individual blades.

9 Claims, 5 Drawing Figures

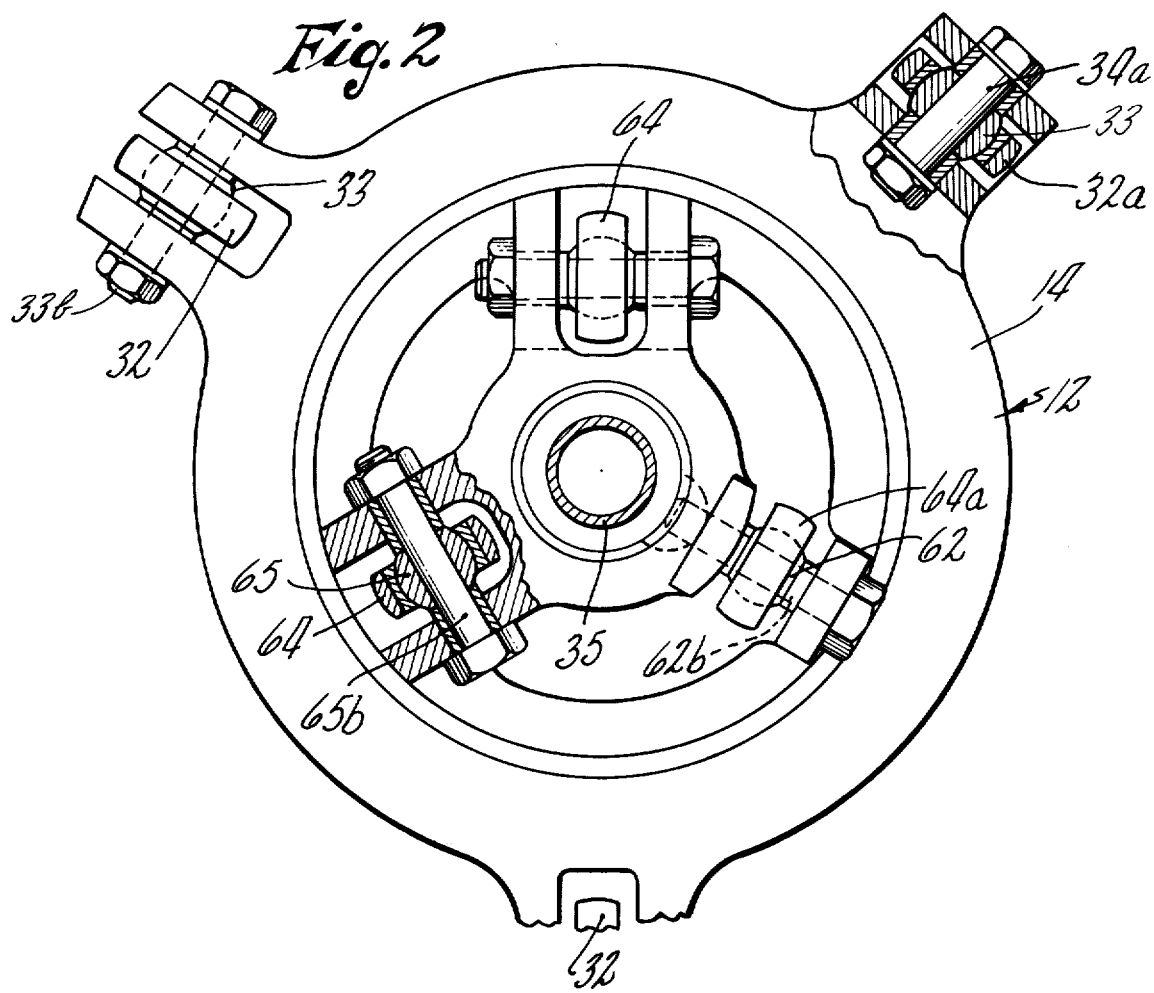
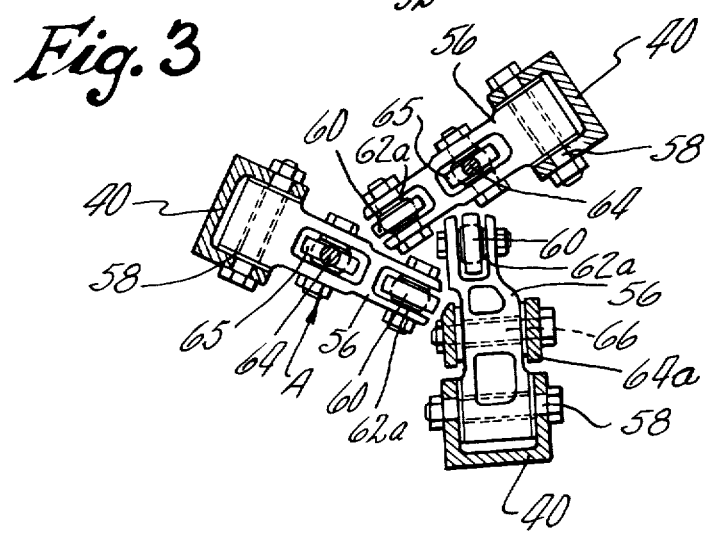

BLADE PITCH CONTROL MECHANISM FOR HELICOPTERS

The invention herein described was made in the course of or under a contract or subcontract thereunder with the Department of the Army.

BACKGROUND OF THE INVENTION

1. Field of Invention

This invention relates to improved control linkage for the upper rotor of coaxial counterrotating helicopter rotors by means of which collective and cyclic pitch is transmitted from a conventional swashplate to the horns of the upper rotor blades.

2. Description of the Prior Art

Prior to this invention it has been the practice to react the torque in the rotatable and non-rotatable swashplate elements by means of scissors, the scissors for the non-rotatable element of the swashplate being connected between the non-rotatable swashplate element and adjacent fixed structure, for example, the transmission housing, and the scissors for the rotatable element of the swashplate being connected between the rotatable swashplate element and a rotatable element of the main rotor drive shaft. However, in coaxial rotor helicopters the presence of the lower rotor makes it desirable to locate the blade pitch control linkage for the upper rotor within the rotor drive shaft and move the blade pitch control horns internal to the rotor drive shaft. The use of conventional non-rotatable and rotatable scissors in a system where centrally located blade pitch control rods are actuated by a plurality of servos located at a radial distance far from the blade horns and their control linkage required additional parts and joints which resulted in increased weight and cost.

SUMMARY OF THE INVENTION

It is an object of this invention to provide an improved blade pitch control mechanism for the upper rotor of a helicopter having coaxial counterrotating rotors.

Another object of this invention is to provide such a control mechanism which utilizes combination torque reacting blade pitch control rods between the servomotors and the non-rotatable swashplate element and between the rotatable swashplate element and a rotating part of the rotor driving structure, thus eliminating conventional non-rotating and rotating scissors.

A further object of this invention is to provide a much lighter and less expensive blade pitch control mechanism for the blades of the upper rotor of a coaxial counterrotating rotor system in which certain of the control rods between the rotatable swashplate element and the blade horns extend through the hollow rotor drive shaft and hence are more distant radially from the servomotors than in a single rotor helicopter in which the blade horns are external of the rotor drive shaft and are located outboard and closer to the servomotors.

A yet further object of this invention is to provide improved means for making pre-track pitch adjustments of individual blades of the upper rotor of a coaxial counterrotating rotor system in which the control rods connected to the blade horns are extended through the tubular rotor drive shaft and therefore are not accessible for this purpose.

In achieving these objects, conventional swashplate, control rod and servomotor elements are utilized. The rotor shown in the drawings is the upper of two coaxial rotors and has three blades. One of the three pitch control rods in the linkage that connects the blade pitch control horns to the swashplate is used to drive the rotatable swashplate element and one of the three pitch control rods in the linkage that connects the servomotors to the swashplate is utilized to hold the non-rotatable element of the swashplate against rotation, thus eliminating the scissors mechanisms previously required.

A still further object of this invention is generally to improve the construction and performance of the blade pitch control mechanism for coaxial, counterrotating helicopter rotors.

BRIEF DESCRIPTION OF THE DRAWINGS

FIG. 2 is a section on line 2—2 of FIG. 1;

FIG. 3 is a section on line 3—3 of FIG. 1;

DESCRIPTION OF THE PREFERRED EMBODIMENT

Figure 1:
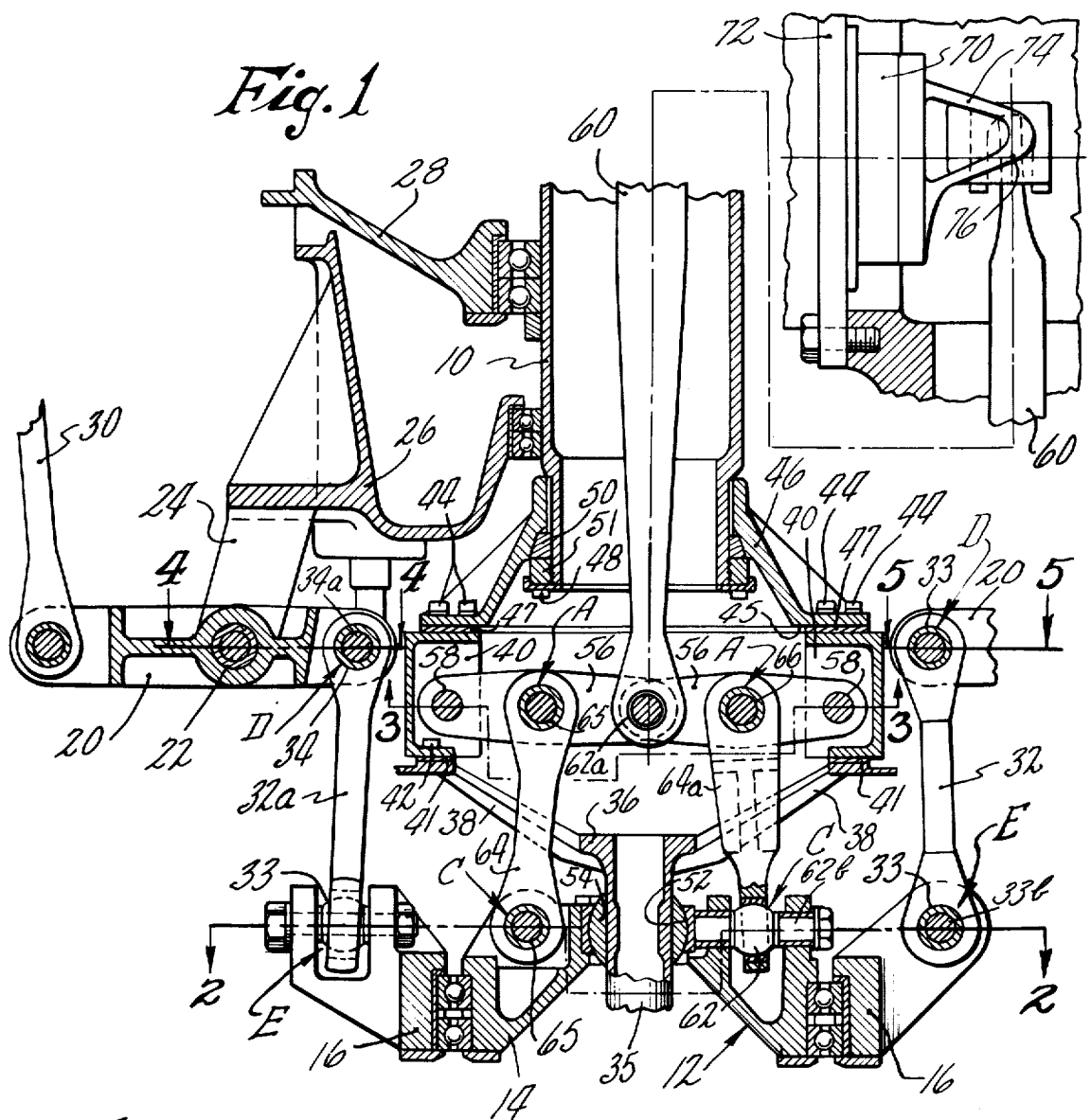
FIG. 1 is a sectional elevation of the blade pitch control mechanism for the upper rotor of a coaxial, counterrotating rotor system which is located below the lower rotor (not shown), parts being broken away to facilitate illustration.

FIG. 1 shows the blade pitch control mechanism for the upper rotor of a coaxial, counterrotating rotor system. The rotor illustrated has three blades. It will be understood that this mechanism is largely located below the lower rotor (not shown) and directly beneath the lower end of the hollow main rotor drive shaft, indicated at 10. Some parts at the right of FIG. 1 have been broken away in order to accommodate a figure of larger scale, but these parts are duplicates of those shown at the left of the figure.

Figure 4:
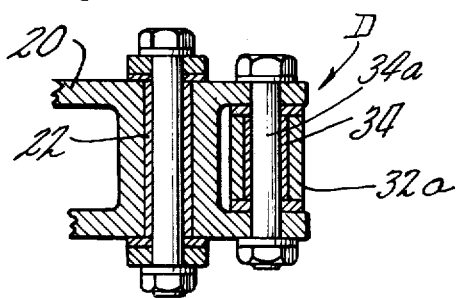
FIG. 4 is a section on line 4—4 of FIG. 1.
Figure 5:
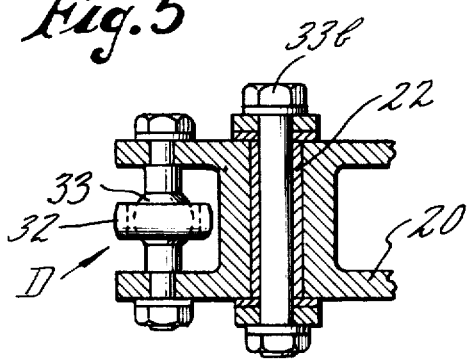
FIG. 5 is a section on line 5—5 of FIG. 1.

A swashplate 12 includes a rotatable element 14 and a non-rotatable element 16 connected by usual bearing means. This is a conventional unit. The support for the swashplate is provided by three transverse walking beams 20 which are centrally supported and mounted by journal bearings 22 on three supports 24 depending from sump 26 of the transmission housing 28. One end of each walking beam is attached to a servomotor (not shown) by a rod 30, one of which is shown in FIG. 1, the other ends of the three walking beams 20 being attached at point D to two control rods 32 and one control rod 32a which are in turn connected at their lower ends at point E to non-rotatable swashplate element 16. Rods 32 have self-aligning ball type bearings 33 at their upper ends at D and at their lower ends at E (FIGS. 1, 2 and 5). The odd control rod 32a has a journal type bearing 34 at point D and a self-aligning ball type bearing 33 at point E (FIGS. 1 and 4). This one combination rod using a journal bearing 34 at point D, and at point E, a self-aligning bearing 33 mounted 90° to the torque load, thereby holds the torque and maintains the swashplate element 16 fixed against rotation.

The swashplate is centrally located in axial alignment with rotor drive shaft 10 by a cylindrical shaft 35 of a hub member 36 which has three arms 38 by which it is secured by bolts 42 to three flanges boxes 40, sets of shims 41 being provided between the ends of arms 38 and boxes 40. The latter are in turn connected by bolts 44 to lands 45 on a conical sleeve 46 splined to main rotor drive shaft 10, sets of shims 47 identical to shims 41 being provided between lands 45 and boxes 40.

Sleeve 46 is secured to drive shaft 10 by clamping means including bolts 48, annular wedge 50 and threaded nut 51. Rotatable swashplate element 14 has an axial socket 52 which receives a spherical ball 54 slidable on shaft 35 to provide collective pitch control. Ball 54 also permits tilting of the swashplate in all directions to provide cyclic pitch control of the blades.

Rotation of element 14 of the swashplate is provided by three transverse walking beams 56 (FIGS. 1 and 3) which are journaled at their outboard ends at 58 to boxes 40 and at their inboard ends are connected to three upstanding control rods 60 by self-aligning ball type bearings 62a. Three depending control rods, or links are connected in turn between points A on walking beams 56 and points C on rotatable swashplate element 14 (FIGS. 1 and 3). Two rods 64 of the three control rods have self-aligning ball type bearings 65 at points A and C. The odd control rod 64a has a journal type bearing 66 at point A and a self-aligning ball type bearing 62 at point C. This one combination rod 64a using a journal bearing 66 at point A, and at point C, a self-aligning bearing 62 mounted 90° to the torque load provides the torque required to rotate swashplate element 14.

FIGS. 1 and 2 best show the different mounting of self-aligning ball type bearings 33 for the two rods 32 and the odd rod 32a. Bearing 33 for the two rods 32 are radially mounted on tangential bolts 33b. Bearing 33 for rod 32a is tangentially mounted on radial bolt 34a. Likewise the different mounting of self-aligning ball type bearings for the two rods 64 and the single odd rod 64a is shown in FIGS. 1 and 2. In these figures the self-aligning ball type bearings 65 for rods 64 are shown mounted radially on tengential bolts 65b while rod 64a has its bearing 62 tangentially mounted on radial bolt 62b.

The three control rods 60 which are connected by self-aligning ball type bearings 62 to the inboard ends of the three walking beams 56 are extended through the tubular drive shaft 10 and are connected to the horns of the three blades of the rotor. In FIG. 1 one blade spindle 70 has been shown extending through the blade hub 72 with its horn 74 pivotally connected to the upper end of a control rod 60 at 76.

In operation, main rotor drive shaft 10 drives conical member 46 which carries boxes 40 with it. Transverse walking beams 56 mounted on the boxes 40 are thus rotated by drive shaft 10. Rotatable element 14 of swashplate 12 is rotated by means of the odd control rod 64a which it will be noted from FIG. 3 has a bifurcated upper end which receives walking beam 56 between its furcations to provide an elongated journal bearing 66 which is transverse to the longitudinal axis of the walking beam and is accordingly able to transmit torque to swashplate element 14 through self-aligning bearing 62 and bolt 62b. Close examination of this construction will indicate that control rod 64a forms one arm of a scissors, the other arm of which is formed by the walking beam 56. Thus the blade control linkage of this invention makes it possible to eliminate the conventional rotatable and non-rotatable scissors. This is of paramount importance in coaxial rotor systems, because in these systems the presence of the lower rotor makes it necessary to move the blade horns inboard of the servomotor location, resulting in unacceptable cost and weight penalties.

It has been the usual practice to make pre-track pitch adjustments of the individual blades by adjusting the length of each blade control rod 60. In the control rod linkage of the upper rotor of coaxial rotors the control rods connected to the blade horns are not accessible for such adjustment. In accordance with this invention, shims 41 and 47 located below and above boxes 40 are provided for this purpose. It will be evident that removing a shim 47 will have the effect of raising journal 58 of walking beam 56 about point A, thus lowering the pivot point 62a for the lower end of rod 60 and corresponding blade pitch horn at its upper end. Similarly adding a shim at this point will raise the control horn of the blade. In order to maintain the same swashplate 12 location relative to member 46, if a shim 47 is added at the top of a block 40 a shim 41 of equal thickness is removed from beneath that block. In other words, it is possible by this shimming to raise or lower any block 40 to make a pre-track adjustment of the pitch of its associated blade without changing the position of hub 36 of the swashplate, the arms 38 of which are supported through blocks 40 on member 46 carried by the lower end of rotor drive shaft 10.

While we have shown and described the preferred embodiment of our invention in considerable detail, we do not wish to be limited to the exact construction disclosed herein as many variations will occur to one skilled in this art which fall within the scope of the appended claims.

We claim:

1. In a helicopter, an upstanding rotor having a drive shaft, a rotor hub mounted at the upper end of said shaft, an axial passage extended through said shaft and into said hub, a variable pitch blade rotatable by said shaft having a spindle extended into said passage, a pitch control horn mounted on the end of said spindle within said passage, and means for controlling the pitch of said blade including a swashplate having rotatable and non-rotatable elements, a member rotatable by said drive shaft adjacent the lower end of the latter, a first pitch control link having a torque transmitting bearing in said rotatable member, a second link extended through said passage connecting said first link to said blade horn, and a third link having means connecting it to said first link and to said rotatable swashplate element for transmitting the rotary movement of said first link to said rotatable element.

2. The combination recited in claim 1 in which the means for connecting said third link to said first link is a journal bearing and the means for connecting said third link to said rotatable swashplate element is a self-aligning ball type bearing.

3. The combination recited in claim 2 in which the rotor is the upper rotor of coaxial counterrotating rotors and in which the first blade control link is a transverse walking beam and the means for connecting said third link to said first link is a journal bearing the axis of rotation of which is parallel with the axis of the journal for said first link.

4. The combination recited in claim 1 in which the first and third links are angularly related and form a torque transmitting scissors.

5. In a helicopter, an upstanding rotor having a drive shaft, a rotor hub mounted at the upper end of said shaft, a passage extended through said shaft and into said hub, a variable pitch blade driven by said shaft having a spindle extended into said passage, a pitch control horn mounted on the end of said spindle within said passage, a swashplate having rotatable and non-rotatable elements, and blade pitch control linkage connecting said rotatable swashplate element with said blade horn comprising a transverse walking beam journaled in structure rotatable with said shaft, a first control link extended through said passage connecting said walking beam to said blade horn, a second control link having a connection at one of its ends to said walking beam and a connection at its other end to said rotatable swashplate element, said connection to said walking beam comprising a torque transmitting journal bearing so oriented as to transmit torque from said rotating walking beam to said second link, and said connection to said rotatable swashplate element comprising a self-aligning ball type joint.

6. The combination claimed in claim 5 in which the rotatable structure for supporting the walking beam includes a truncated conical member fixed to said shaft at its smaller upper end and provided with a peripheral land at its lower end and a mounting block secured to said land to which said walking beam is pivotally connected, and means for effecting pre-track adjustment of the pitch of said blades by varying the spacing of said block from said land.

7. The combination claimed in claim 6 in which shims are provided between said block and said land.

8. In a helicopter, an upstanding rotor having a drive shaft, a rotor hub mounted at the upper end of said shaft, a passage extending through said shaft and into said hub, a plurality of variable pitch blades rotatable by said shaft having spindles extended into said passage, pitch control horns fixed to said spindles within said passage, and means for controlling the pitch of said blades including a conical member fixed to said shaft at its upper and smaller end having a plurality of spaced peripheral lands at its lower end, a plurality of mounting blocks secured to said lands, a swashplate having rotatable and non-rotatable elements, said rotatable element having a hub on which said swashplate is universally mounted, said hub having arms secured to said blocks, a transverse walking beam on each of said blocks, a blade pitch control rod extended through said passage connecting each walking beam to a different blade horn, blade pitch control links connected at one of their ends to said beams and at their other ends to said rotatable swashplate element, all of said links save one having self-aligning ball type joints forming said connections at both ends, the odd link having a self-aligning ball type joint connecting it to said rotatable swashplate element and a second journal bearing connecting it to said walking beam, said second journal bearing being so oriented as to transmit torque from said rotating walking beam to said rotatable swashplate element.

9. The combination recited in claim 8 in which means is provided for effecting pre-track adjustment of individual blade pitch while maintaining the same position of said swashplate relative to said conical member including a set of shims located between each mounting block and the land on said conical member to which it is secured and a second set of identical shims located between each block and the arm of said hub secured thereto.

* * * * *